united States Patent [19]

Bhatt et al.

[11] Patent Number: 4,996,018

[45] Date of Patent: Feb. 26, 1991

[54] HIGH PRESSURE THIMBLE/GUIDE TUBE SEAL FITTING WITH BUILT-IN LOW PRESSURE SEAL ESPECIALLY SUITABLE FOR FACILITATED AND MORE EFFICIENT NUCLEAR REACTOR REFUELING SERVICE

[75] Inventors: Pankaj N. Bhatt, Plum Boro; Ronald M. Blaushild, Export, both of Pa.

[73] Assignee: Westinghouse Electric Corp., Pittsburgh, Pa.

[21] Appl. No.: 340,187

[22] Filed: Apr. 19, 1989

[51] Int. Cl.$^5$ .............................................. G21C 13/00
[52] U.S. Cl. .................................. 376/203; 376/205; 376/263
[58] Field of Search ..................... 376/203, 205, 263

[56]  References Cited

U.S. PATENT DOCUMENTS

| | | | |
|---|---|---|---|
| 4,164,443 | 8/1979 | Gibbons | 376/365 |
| 4,716,004 | 12/1987 | Merkovsky et al. | 376/203 |
| 4,717,529 | 1/1988 | Merkovsky et al. | 376/245 |
| 4,728,479 | 3/1988 | Merkovsky | 376/203 |
| 4,778,647 | 10/1988 | Gasparro | 376/347 |

Primary Examiner—Stephen J. Lechert, Jr.
Assistant Examiner—N. Bhat
Attorney, Agent, or Firm—D. C. Abeles

[57]  ABSTRACT

A HP/LP seal arrangement is provided for a guide tube and thimble extending outwardly from the core of a nuclear reactor to a seal table where the guide tube is welded to the seal table to provide a high pressure seal relative thereto. A tubular seal fitting is disposed in alignment with the guide tube with the thimble extending therethrough on the low pressure side of the seal table.

A first high pressure seal couples one end of the fitting to an end of the guide tube to prevent leakage from within the guide tube. Inwardly facing threading is disposed adjacent the other and outer end of the seal fitting. A nut is disposed about the thimble and it is provided with outwardly facing threading in mating engagement with the fitting threading.

The fitting has a seal seat spaced longitudinally inwardly from the threading and facing the fitting outer end and extending annularly about the inner surface of the fitting. A deformable ring seal is integral with the nut and is disposed about the thimble and between the nut body and the fitting seal seat. The ring seal has respective sealing surfaces in engagement with the radially outwardly facing surface of the thimble, the radially inwardly facing surface of the fitting and the fitting seal seat to provide a low pressure seal between the fitting and the thimble. A second releasable high pressure seal couples the thimble to the outer end portion of the guide tube.

7 Claims, 6 Drawing Sheets

HIGH PRESSURE THIMBLE/GUIDE TUBE SEAL FITTING WITH BUILT-IN LOW PRESSURE SEAL ESPECIALLY SUITABLE FOR FACILITATED AND MORE EFFICIENT NUCLEAR REACTOR REFUELING SERVICE

BACKGROUND OF THE INVENTION

The present invention relates to nuclear reactors and more particularly to pressure seal fittings especially adapted to providing a high pressure thimble/guide tube seal during reactor operation and a low pressure thimble seal during refueling service when the high pressure seal is released for thimble withdrawal.

Generally, refueling of pressurized water reactors is an established, routine operation carried out with a high degree of reliability. Refueling is normally performed every 8 to 18 months, depending upon load requirements. For economy, it is desirable that the refueling operation be accomplished as quickly as possible. In recent years a number of design innovations have considerably simplified refueling operations, reducing the number of operator actions required during refueling and, hence, considerably reducing the amount of time for a complete refueling operation from approximately four weeks, to less than seven days. The present invention is generally directed toward further facilitating reactor refueling operations, minimizing the downtime of the reactor during such refueling, and increasing the reliability of certain components which must be manipulated during refueling.

In a typical pressurized water nuclear reactor arrangement, the reactor vessel is seated in a concrete well and contains the usual nuclear reactor core and instrumentation. A plurality of stainless steel tubes, referred to as thimbles, extend, during normal reactor operation, from the upper plate of the core downwardly to the bottom of the vessel where they pass through the bottom of the vessel and terminate at a point exterior to the vessel well. The thimble is normally empty, however, approximately once a month a neutron flux detector is pushed through the thimble to the top of the core and then slowly retracted while neutron flux readings are taken with suitable flux mapping equipment to which the detector is connected outside the thimble.

The thimble itself is housed in a larger stainless steel tube, referred to as a guide tube, which is welded to the bottom of the vessel, thereby forming a conduit for the thimble to pass through the vessel. The interior of the thimble guide tube is exposed to the reactor cooling water, and the operating pressure of the system (typically about 2400 psi), whereas the inside of the thimble is essentially dry and at atmospheric pressure.

The guide tube and the internally located thimble extend on the exterior of the vessel from the vessel bottom through the concrete wall forming the vessel well to a stainless steel plate, known as a seal table, which is typically vertically disposed. A termination stub of the guide tube penetrates the seal table and is welded thereto. The thimble passes entirely through the guide tube and extends beyond the seal table toward the flux mapping equipment.

Because the space between the outer surface of the thimble and the inner surface of the guide tube is exposed to the operating pressure of the reactor, it is necessary during normal reactor operation to have a high pressure seal at the seal table at the point where the thimble exits the guide tube in order to prevent reactor coolant from being expelled from the guide tube.

During a refueling operation, it is necessary to retract the thimble a number of feet in order to remove it from the volume of the nuclear core. To do this, the high pressure seal at the seal table between the guide tube stub and the thimble is disassembled so that the thimble can be retracted the necessary distance. Although the reactor is powered down during the refueling operation and the water pressure within the vessel is concomitantly reduced, it is still necessary to have a low pressure seal between the guide tube stub and the thimble because the seal table is located approximately at or below the upper flange of the vessel and is thus below the water level of the refueling canal which is normally filled during the refueling operation.

During refueling, it had originally been necessary to lower the reactor water level when the high pressure thimble seals were to be released to permit thimble withdrawal from the thimble guide tubes. A low pressure seal then had to be installed between each thimble and its guide tube (typically about 50 thimbles per reactor) so that the reactor water level could be raised again to provide shielding sufficient to keep radiation below an acceptable level upon removal of fuel assemblies from the reactor vessel. Upon placement of the new fuel assemblies, the reverse process would have to be followed, i.e. lower the water level to permit removal of the low pressure thimble seals, reinsert the thimbles and reestablish the high pressure thimble seals, and finally again raise the reactor water level.

In U.S. Pat. No. 4,728,479 entitled HIGH PRESSURE SEAL FITTING WITH BUILT-IN LOW PRESSURE SEAL ARRANGEMENT filed by Daniel Merkovsky on Jan. 9, 1986 and assigned to the present assignee there is disclosed a thimble seal structure which provides a releasable high pressure (HP) seal and further provides a built-in low pressure (LP) seal that becomes operative when the high pressure seal is released. Thimble withdrawal for reactor refueling could thus be achieved without requiring that the reactor water level be lowered for the installation of special low pressure seals. As a result, thimble seal reliability was improved as refueling service was significantly facilitated and economized.

In the Merkovsky guide tube seal fitting, the built-in low pressure seal includes a flexible seal that is sized and located to provide sealing contact against the outer thimble surface and the inner guide tube fitting surface in response to low fluid pressure without substantial deformation of the seal. A backup washer surrounds the thimble and covers the seal and is held in place by a nut which also surrounds the thimble The washer in effect limits the compression force from the nut on the flexible seal and thus by design essentially prevents seal deformation.

While improvement was achieved with the Merkovsky fitting, some difficulties have nonetheless persisted. First, the quality of the Merkovsky low pressure seal is dependent on the geometry of the seal relative to that of the particular thimble and guide tube with which it is being used. In other words, the sealing contact forces are not controllable through adjustments and thus minor dimensional differences within specified tolerances can cause the sealing quality to vary from thimble seal to thimble seal.

Another difficulty occurs when the thimble is retracted for core refueling or reinserted after refueling.

As the thimble is moved along its axis, the outer thimble surface imposes friction forces on the inner surface of the seal and thus tends to cause the seal to flow into the gap between the thimble outer surface and the inner surface of the HP/LP seal fitting. When this happens, the seal may be damaged or the final position and configuration of the seal may be such that the seal has to be replaced because of low pressure leakage. In that event, the built-in LP capability of the HP/LP seal fitting is effectively lost and the purpose in having a HP/LP seal is defeated.

Finally, the small size and the number of parts involved in installing the LP seal for the fifty thimbles in a typical reactor causes handling difficulties and excessive service time requirements for heavily gloved nuclear service people when the HP/LP fittings are first assembled with the thimbles or when any LP seal has to be replaced. Thus, the LP seal is formed by use of three separate small parts: a flexible seal fitted over the thimble against a seat on the fitting housing, a stainless steel washer that fits over the thimble against the seal, and a nut that fits over the thimble and is threaded along the outer fitting housing against the washer. The flexible seal is a thin O-shaped member with an outer diameter of about 0.4 inches. The washer that fits over the seal has an outer diameter of 0.5 inches.

It has thus been desirable that a new and better HP/LP thimble seal arrangement be developed for reactors so that better LP seals can be provided while refueling service is further facilitated and economized.

SUMMARY OF THE INVENTION

A HP/LP seal arrangement is provided for a guide tube and thimble extending outwardly from the core of a nuclear reactor to a seal table where the guide tube is welded to the seal table to provide a high pressure seal relative thereto. A tubular seal fitting is disposed in alignment with the guide tube with the thimble extending therethrough on the low pressure side of the seal table.

A first high pressure sealing means couples one end of the fitting to an end of the guide tube to prevent leakage from within the guide tube. Inwardly facing thread means is disposed adjacent the other and outer end of the seal fitting. A nut is disposed about the thimble and it is provided with outwardly facing threading in mating engagement with the fitting thread means.

The fitting has a seal seat spaced longitudinally inwardly from the thread means and facing the fitting outer end and extending annularly about the inner surface of the fitting. Deformable ring seal means is disposed about the thimble and between the nut and the fitting seal seat. The ring sealing means has respective sealing surfaces in engagement with the radially outwardly facing surface of the thimble, the radially inwardly facing surface of the fitting and the fitting seal seat to provide a low pressure seal between the fitting and the thimble. Second releasable high pressure sealing means couples the thimble to the outer end portion of the guide tube.

DESCRIPTION OF THE PREFERRED EMBODIMENT

Figure 1:
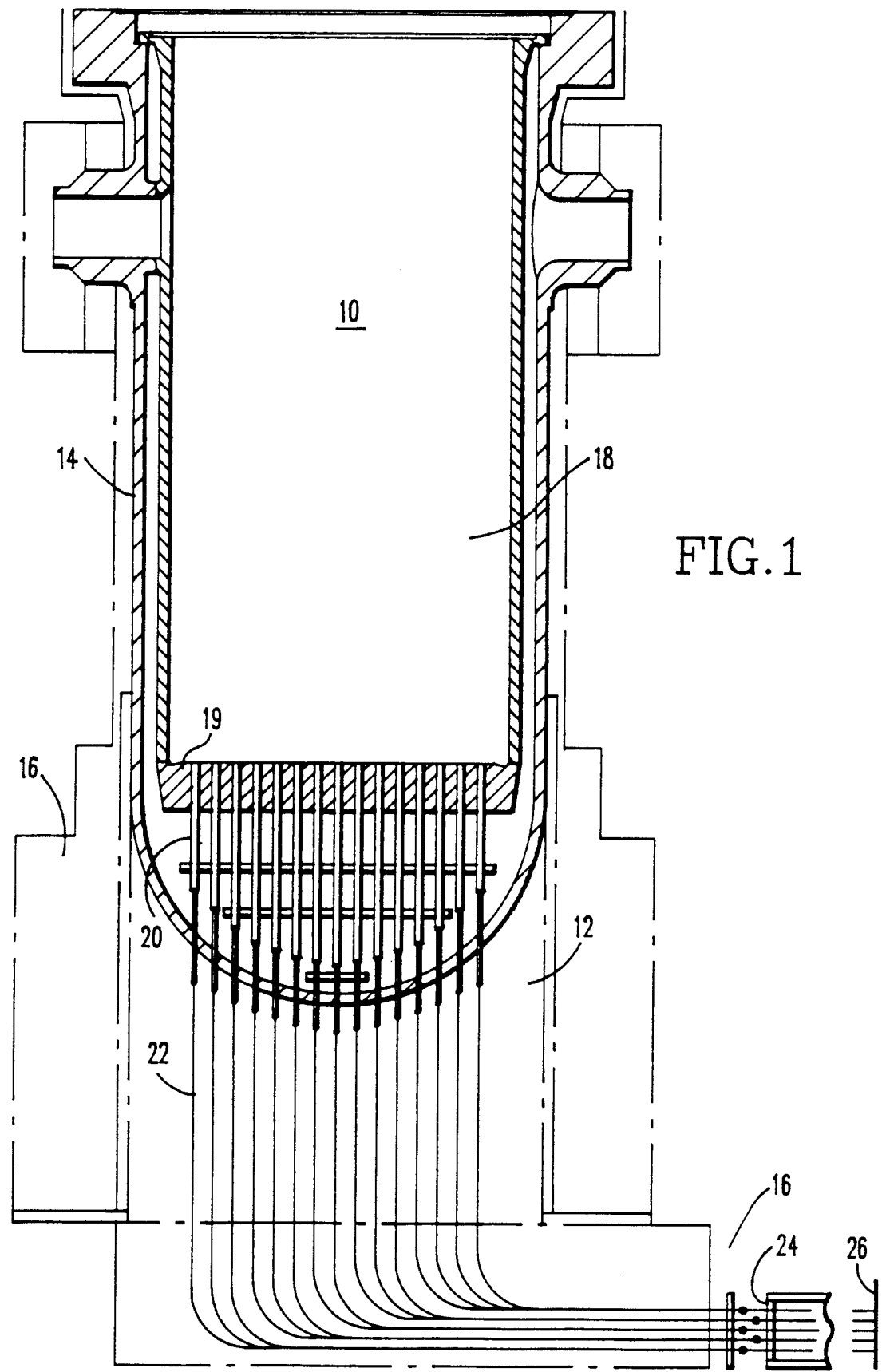
FIG. 1 shows an elevational view of a pressurized water reactor schematically highlighting the guide tube and thimble structure for the insertion and withdrawal of core instrumentation.

More particularly, there is shown in FIG. 1 a pressurized water nuclear reactor 10 disposed in a concrete well 12. The reactor 10 includes a pressure vessel 14 supported by a cylindrical concrete wall 16 that forms the well 12.

A fuel core assembly 18 is supported within the vessel 14 and it includes a bottom core plate 19 from which guide tubes 20 are extended vertically downwardly to serve as conduits for thimbles 22 that extend vertically upwardly into reactor fuel core 21. In one typical reactor unit, a total of 58 thimbles and associated guide tubes are disposed across the area of the fuel core. The guide tubes 20 and the thimbles 22 extend downwardly through the bottom of the pressure vessel 14 to a lower elevation where they are curved to extend horizontally through the concrete wall 16 to a vertically extending seal plate or table 24.

When the reactor 10 is operating, the thimbles 22 are fully inserted through the guide tubes 20 into the reactor core 21 so that instrumentation may be inserted through the thimbles into the core for flux mapping from time to time. When the reactor 10 is shut down for refuelinq, the thimbles 22 are withdrawn so that the top ends of the thimbles 22 are below the core fuel assemblies. A stop plate 26 is disposed outside the concrete wall 16 to limit the withdrawal movement of the thimbles 22.

Since pressurized water occupies the space between each thimble 22 and its guide tube 20 to provide thimble cooling during reactor operation, each guide tube and its thimble must be sealed at the seal plate 24 against high reactor operating pressure. Since the HP seal must be released to permit thimble withdrawal when the reactor 10 is shut down for refueling, and since water must be retained within the pressure vessel 14 to limit radiation, an LP seal is required for the space between each thimble 22 and its guide tube 20 during the refueling process.

PRIOR ART HP/LP THIMBLE SEAL

Figure 2:
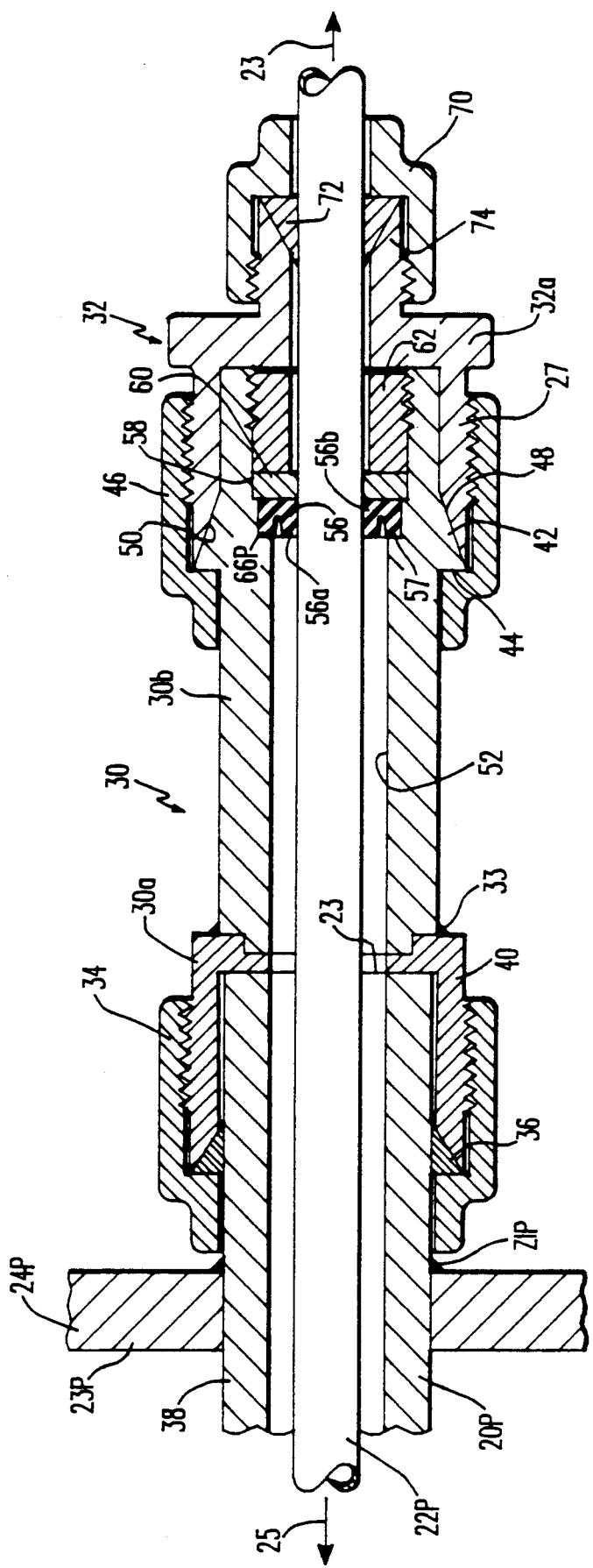
FIG. 2 shows an axial sectional view of a prior art HP/LP seal fitting for reactor thimble and guide tube structure.

In U.S. Pat. No. 4,728,479 issued to D. Merkovsky, there is disclosed a single fitting that provides both HP and LP seals for the reactor guide tube and thimble structure at the seal plate location. The Merkovsky structure is shown in FIG. 2 and is believed to be the most relevant of the known prior art.

A guide tube 20P extends through a seal plate 24P and a thimble 22P is located within the guide tube 20P and extends coaxially therewith through the seal plate. The guide tube 20P is welded to the seal plate as indicated by the reference character 21P to provide a seal against fluid leakage from high pressure side 23P of the seal plate 24P.

A fitting body 30 is disposed between a reducer union 32, which is sealed to the thimble 22P, and a lock nut 34 and a ferrule 36 which are disposed on a stub end 38 of the guide tube 20P. The fitting body comprises two components 30a and 30b which are welded together as indicated by the reference character 33 to provide a unitary housing member for the seal fitting The component 30a comprises a socket 40 configured to receive the guide tube stub 38 and to cooperate with the lock nut 34 and the ferrule 36 to form a high pressure seal against fluid leakage from within the guide tube 20P through any space between the socket 36 and the guide tube stub 38.

Fitting body component 30b is provided in the region of its free end with an integral projection 42 which projects outwardly around the entire circumference of component 30b and is shaped to simulate a conventional ferrule. Accordingly, the projection 42 has a radial surface 44 which serves as a stop for a lock nut 46 and an inclined surface 48 which is compressed against a corresponding compression surface 50 of reducer union 32 to form a high pressure seal therewith against leakage from the space between the guide tube 20P and the thimble 22P.

Fitting body 30 has an inner surface 52 defining a through passage for slidably accommodating the thimble 22P. The inner surface 52 is provided ion the region of the free end of component 30b with a first annular recess 54 for accommodating a rubber seal ring 56 which has a U-shaped axial cross section, and a second annular recess 58 which has a greater diameter than the first recess 54 for accommodating a stainless steel washer 60. Between annular recess 58 and the free end of component 30b the inner surface 52 is provided with threads to receive a seal nut 62. The seal nut 62 is provided with a suitable slot (not shown) in its axial end facing reducer union body 32a to receive an appropriate tool for tightening the nut 62 against the washer 60, which in turn presses against the adjacent axial end of U-shaped seal 56. The recess 54 in which the U-shaped seal 56 is disposed defines a radial surface 64 which presents an axial seat for the other end of U-shaped seal 54 so that the seal 56 is essentially held between the axial seat 64 and the washer 60. Additionally, the annular recess 58 in which the washer 60 is seated defines a radial surface 66 which presents an axial seat so that the washer 60 is prevented from compressing cup-shaped seal 65 beyond its design limits, i.e. without any substantial deformation as previously indicated.

The seal ring 56 is sized to produce sealing action without any substantial deformation. Such auxiliary action occurs as a result of fluid pressure against the inner sides of the inner and outer legs 56a and 56b of the seal ring 56. Such pressure forces the seal into contact with the inner surface 61 of the fitting housing and with the outer surface of the thimble 20P.

Use of the fitting body 30 described permits the guide tube stub 36 to be sealed to the thimble 22P with respect to high operating pressures by virtue of the high pressure compression seals formed by the lock nut 34, the ferrule 36 and the socket 40; by the lock nut 46, the projection 42, and the lock nut diameter projection 27 of the reducer union 34; and a lock nut 70, ferrule 72 and the small diameter projection 74 of the reducer union 32. Further, the seal fitting 30 has a low pressure seal built into its end adjacent the reducer union 32 so that, when the lock nut 46 is loosened and the thimble is retracted in the direction 21, the U-shaped seal ring 56 maintains a low pressure seal between the inner surface 52 of the component 30b and the outer surface of the thimble 22P.

When it is necessary to reassemble the high pressure seal for normal reactor operating pressures, the thimble 22P is slid through the fitting 30 in the direction 25 toward the reactor until the reducer union 32 is in the correct position juxtaposed the projection 42 so that the lock nut 46 can be secured to re-create the high pressure compression seal at that point.

As previously indicated, the prior art HP/LP seal structure is characterized with no effective control over the sealing contact force applied by the seal legs 56a and 56b against the thimble 22P and the inner seal housing surface 52. Thus, the sealing contact force is determined principally by the fit of the seal 56 on its seat 57 between the thimble 22P and the housing surface 52 within radial dimensional tolerances and from fluid pressure on the seal legs 56a and 56b essentially without any added sealing force from deformation of the seal 56. Thus, the washer 60 retains the seal 56 against axial movement without imposing any significant seal deforming compression force.

Further, the seal is highly susceptible to flowing into the annular gap between the thimble 22P and the seal housing inner surface 52 when the thimble 22P applies axially direct frictional forces to the seal leg 56b as the thimble 22P is moved in either the direction 23 or the direction 25. When the seal 56 is displaced in this manner, it usually must be replaced.

Finally, the number and small size of the parts 56, 60 and 62 that form the LP seal make a refueling process more cumbersome and time consuming than is desirable for nuclear service people who typically must wear heavy gloves.

IMPROVED HP/LP THIMBLE AND GUIDE TUBE SEAL FITTING

Figure 3:
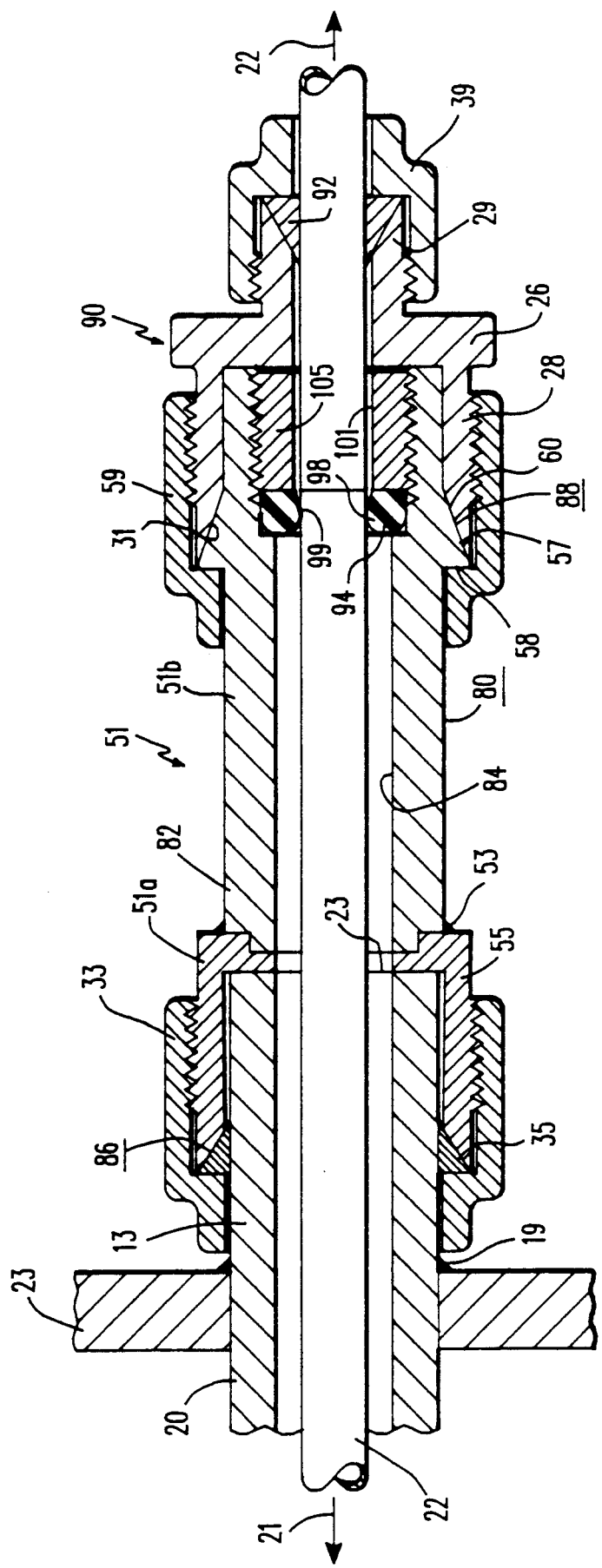
FIG. 3 shows an axial sectional view of an improved HP/LP thimble and guide tube seal arrangement in accordance with the present invention.

In FIG. 3 there is shown a new HP/LP thimble and guide tube seal fitting arranged in accordance with the invention to provide better operating seals while simultaneously further facilitating and economizing nuclear refueling service. The seal fitting structure shown is generally like that described for the prior art in that it is especially configured for retrofitting use with previously installed reactors having thimble guide tubes with cylindrically shaped stub ends. In other applications of the invention, a portion of the seal fitting structure can be integrated with the guide tube stub end as will become more apparent hereinafter.

The seal plate 23 of FIG. 1 is provided with an opening through which each guide tube 20 extends. An instrumentation thimble 22 is disposed coaxially within each guide tube 20.

A HP/LP seal fitting 80 is secured at one of its ends to an end stub of the guide tube 20 and at its other end to the thimble 22. The fitting 80 includes a tubular housing 82 having an inwardly facing cylindrical surface 84 aligned with a counterpart surface within the guide tube 20 and defining a guide space within which the thimble 22 is disposed for insertion into and withdrawal from the reactor core.

High pressure sealing means 86 like that previously described is provided for securing the guide tube end of the seal fitting 80 against HP leakage through the union of the guide tube 20 with the fitting 80. Another high pressure seal means 88 like that previously described includes an end cap 90 and seals the other end of the fitting against HP leakage through the union of the cap 90 and the fitting housing 82. Finally, a high pressure seal means 92 like that previously described secures the end cap 90 to the thimble 22 against HP leakage between the thimble 22 and the housing cap 92.

When the reactor is to be refueled, the HP sealing means 92 is released so that the thimble 22 can be withdrawn and subsequently reinserted. During the refueling service time, an LP seal is provided by LP sealing means 94 to limit or prevent leakage through the gap between the thimble 22 and the seal fitting housing 824.

Figure 6A:
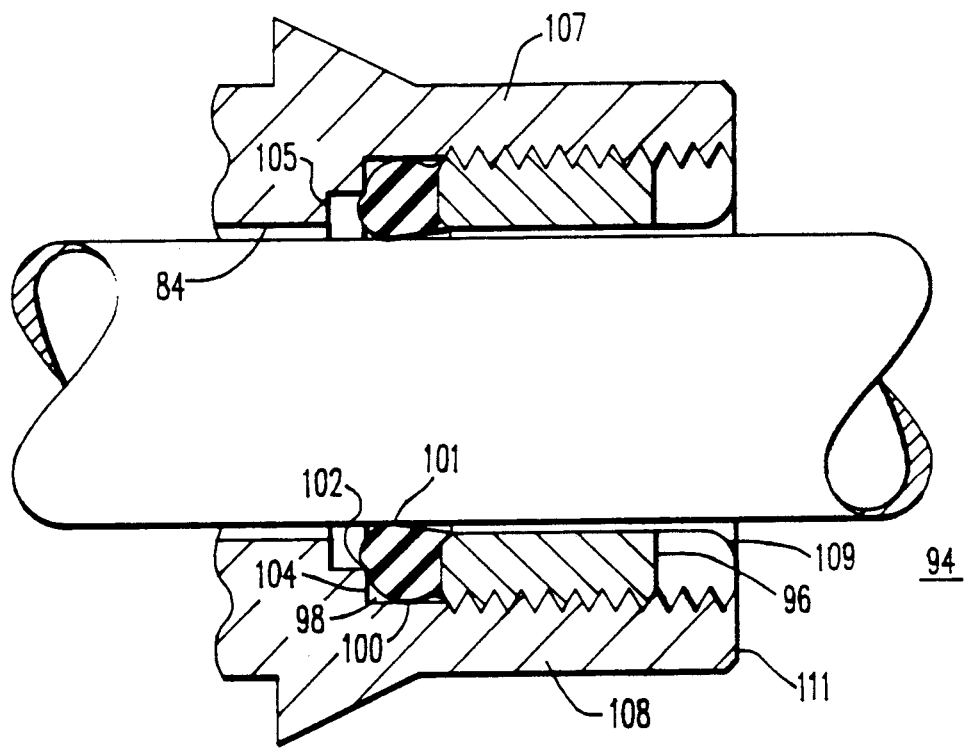
FIGS. 6A and 6B show an enlarged portion of the arrangement of FIG. 3 illustrating the manner in which the new structure provides an LP seal between the thimble and the thimble seal fitting.
Figure 6B:
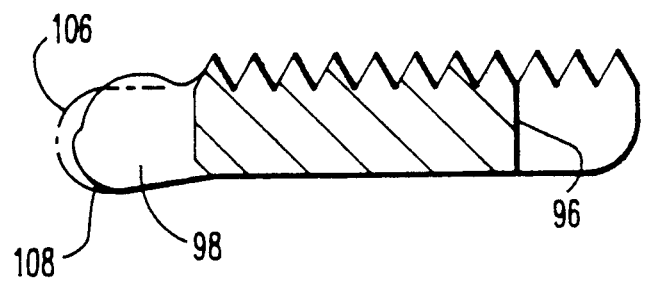

As shown in FIG. 6A, the LP sealing means 94 comprises a nut 96 and a flexible seal 98. The seal 98 reacts to deformation when installed to provide LP sealing contact with the thimble 22 along circumferential surface 101 and with the fitting housing along circumferential surface 100 and preferably along circumferential edge 102 of an annular seal seat surface 104. In effect, the sealing contact areas 100 and 102 act as seal backups to each other. The seal deformation under nut pressure that causes the described sealing contact is illustrated in FIG. 6B by before contact profile 106 and after contact profile 108.

Figure 4:
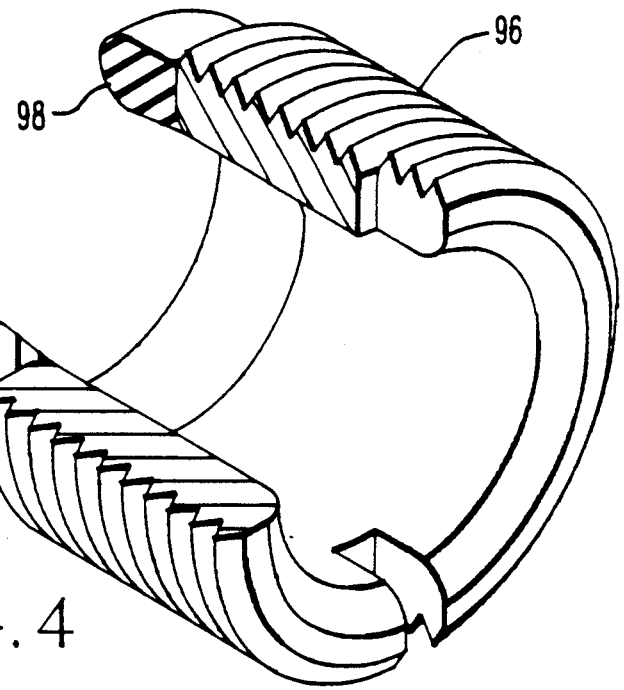
FIG. 4 is an enlarged perspective view of a sealing nut employed in the arrangement of FIG. 3.
Figure 5:
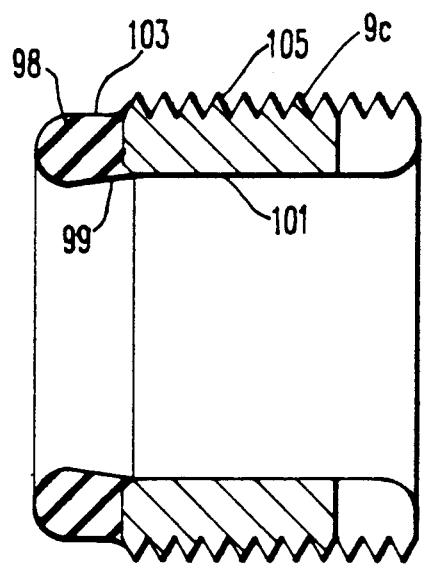
FIG. 5 shows an enlarged cross-section of the sealing nut taken along a reference plane that contains the sealing nut axis.

The preferred structure for the LP sealing means 94 is shown most clearly in FIGS. 4 and 5. It is preferably a unitary structure that facilitates handling in the nuclear service environment. The seal 98 is bonded to the nut 96 thereby avoiding the prior art seal flow problem during thimble insertion and withdrawal. Generally, the seal 98 has a radially inner annular surface generally aligned with inner annular surface 101 of the nut 96; it also has a radially outer annular surface 103 preferably generally aligned with a cylindrical reference plane 105 passing through the inmost depth of the nut threading so that the seal will not be damaged during threading and unthreading of the nut 96 into or out of seal fitting housing 108. However, the seal 98 includes a portion 99 that projects slightly radially inwardly from inner annular surface 101 of the nut along the axial direction away from the nut 96. The latter structural feature enhances the sealing contact against the thimble surface.

The seal and nut structure shown in FIGS. 4 and 6A is arranged to enable it to be used in retrofitting applications where HP/LP seal fittings like the Merkovsky fitting have already been installed in a reactor plant. Thus, the improved seal performance provided by the present invention can be achieved in installed HP/LP seal fittings without remachining or otherwise altering the seal installed fitting housing. The seal seat surface 104 corresponds to the washer seat surface in the Merkovsky seal fitting housing design, and surface 105 corresponds to the seal seat surface in the prior Merkovsky seal fitting design. In applying the present invention in the prior Merkovsky housing design, no use is made of the surface 105.

As one alternative in a new housing design, the surface 105 can be eliminated and the seal seat surface can be extended further radially inwardly to inner surface 84 of the seal housing. In that case, a larger surface 104 would be available for seal seating and less seal flow around the edge 102 would occur under nut pressure.

To install the LP seal, the nut 96 is threaded into outer end portion 107 of the seal housing until its outer end surface is flush with outer end surface 11 of the seal housing end portion 107. At that point, the nut pressure on the seal 98 by design provides the nominal force that produces the seal deformation illustrated in FIG. 6A. If desired, the installer can fine tune the sealing force by either loosening or tightening the nut 96 somewhat. For example, some leakage may be observed along the thimble, and the nut 96 could then be tightened to stop the leakage. In this manner, the LP seal for each of the multiple thimbles in a reactor can be individually adjusted through the seal contact force control provided by the invention.

Figure 7:
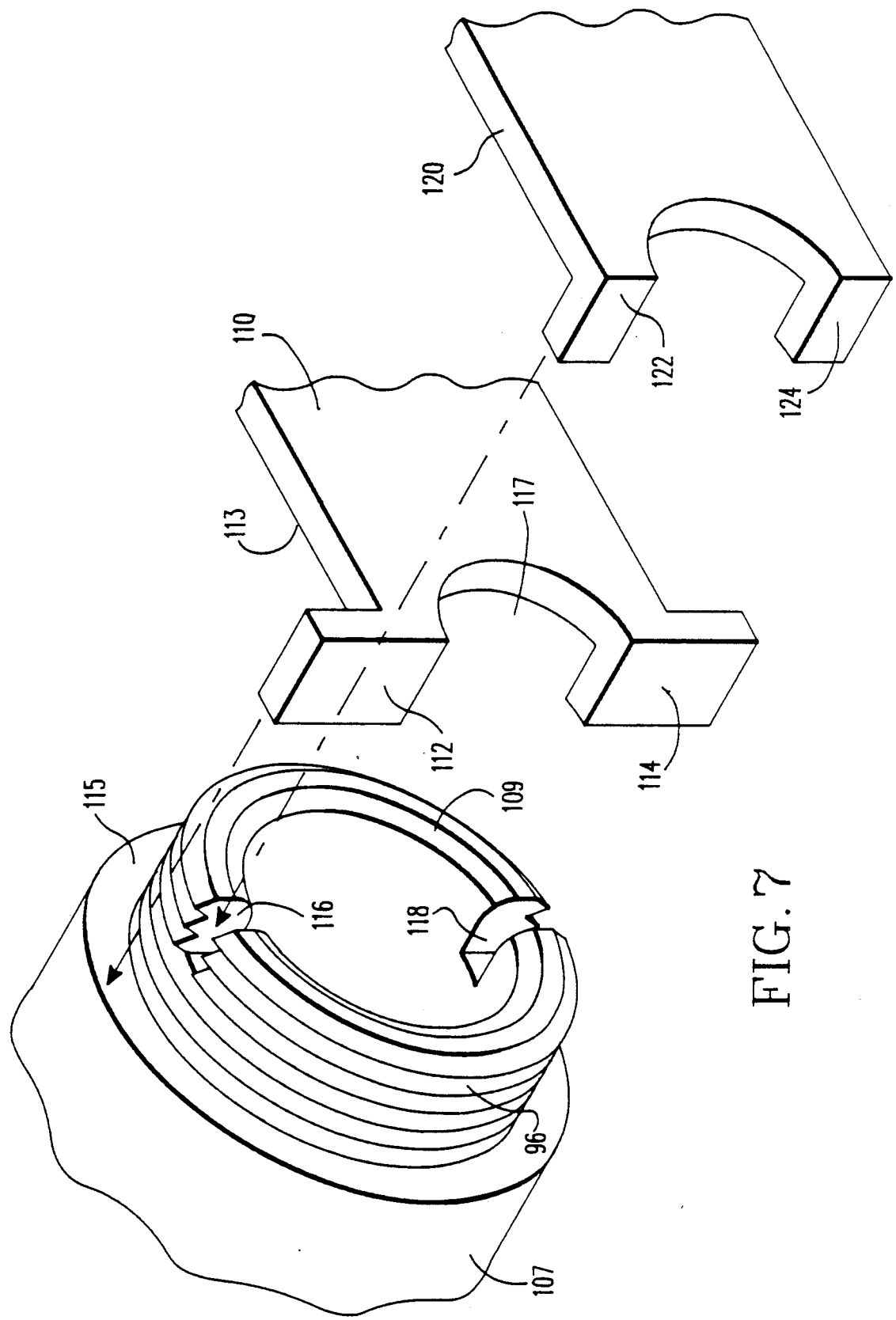
FIG. 7 shows an enlarged perspective view of tools that may be used to assemble the sealing nut with the thimble seal fitting while controlling the force applied to the seal and thus the sealing contact made by the seal.

In FIG. 7, there is shown a special wrench 110 having wings 112 and 114 that fit into slots 116 and 118 in the outer end 109 of the nut 96 and further having an end slot 117 that enables the wrench to fit around the thimble 22. Bottom face 113 of the wrench 110 rests against the end 109 of the nut 96. When the wrench has turned the nut 96 such that wrench face 113 has advanced to contact outer end face 115 of the end portion 107 of the fitting housing, the nut has reached its nominal position to provide nominal deformation pressure on the seal as shown in FIG. 6A.

Another wrench 120 is provided with narrow wings 122 and 124 that are sized to the nut slots 116 and 118. The wrench 120 thus can be used to produce further inward tightening movement of the nut 96 for fine control of the sealing contact force.

With the LP seal installed, withdrawal and insertion movement of the thimble 22 can be executed during refueling with significantly reduced risk that the seal 98 will be forced frictionally by the thimble 22 into the annular space between the thimble 22 and the seal fitting housing surface 84. Simultaneously, the invention enhances the quality of the LP seal and the entire refueling process is further facilitated and economized.

What is claimed is:

1. A HP/LP seal arrangement for an elongated guide tube and an elongated thimble disposed therein, said guide tube and thimble extending outwardly from the core of a nuclear reactor to a seal table where said guide tube is welded to the seal table to provide a high pressure seal relative thereto, said seal arrangement comprising:

a tubular seal fitting disposed in alignment with said guide tube with said thimble extending therethrough on the low pressure side of the seal table;

first high pressure sealing means coupling one end of said fitting to an end of said guide tube to prevent leakage from within said guide tube;

inwardly facing thread means disposed adjacent the other and outer end of said seal fitting;

a nut having an opening through which said thimble extends and further having outwardly facing threading in mating engagement with said fitting thread means;

said fitting having a seal seat spaced longitudinally inwardly from said thread means and facing said fitting outer end and further disposed annularly about the inner surface of said fitting;

deformable ring seal means disposed about said thimble and between said nut and said fitting seal seat and having respective surfaces in engagement with the radially outwardly facing surface of said thimble, the radially inwardly facing surface of said fitting and said fitting seal seat to provide a low pressure seal between said fitting and said thimble; and second releasable high pressure sealing means coupling said thimble to the outer end portion of said guide tube.

2. A seal arrangement as set forth in claim 1 wherein said deformable ring seal means is integrally joined with the longitudinally inwardly facing clamping surface of said nut.

3. A seal arrangement as set forth in claim 2 wherein the depth of said nut is sized so that nominal compression force is exerted on said ring sealing means to provide nominal seal deformation and sealing contact forces when the nut threading and said fitting thread means are fully engaged with the outer end face of said nut and the outer fitting end aligned.

4. A seal arrangement as set forth in claim 2 wherein the radially outwardly facing surface of said ring sealing means is substantially aligned with a cylindrical reference surface through the nut threading at its in most extent.

5. A seal arrangement as set forth in claim 2 wherein the radially inwardly facing surface of said ring sealing means extends slightly radially inwardly from the radially inward facing nut surface so as to enhance sealing contact with said thimble.

6. A seal arrangement as set forth in claim 3 wherein the radially outwardly facing surface of said ring sealing means is substantially aligned with a cylindrical reference surface through the nut threading at its inmost extent.

7. A seal arrangement as set forth in claim 3 wherein the radially inwardly facing surface of said ring sealing means extends slightly radially inwardly from the radially inward facing nut surface so as to enhance sealing contact with said thimble.

* * * * *